(No Model.)  
4 Sheets—Sheet 1.
C. E. WHITMAN.
BALING PRESS.
No. 531,240. Patented Dec. 18, 1894.
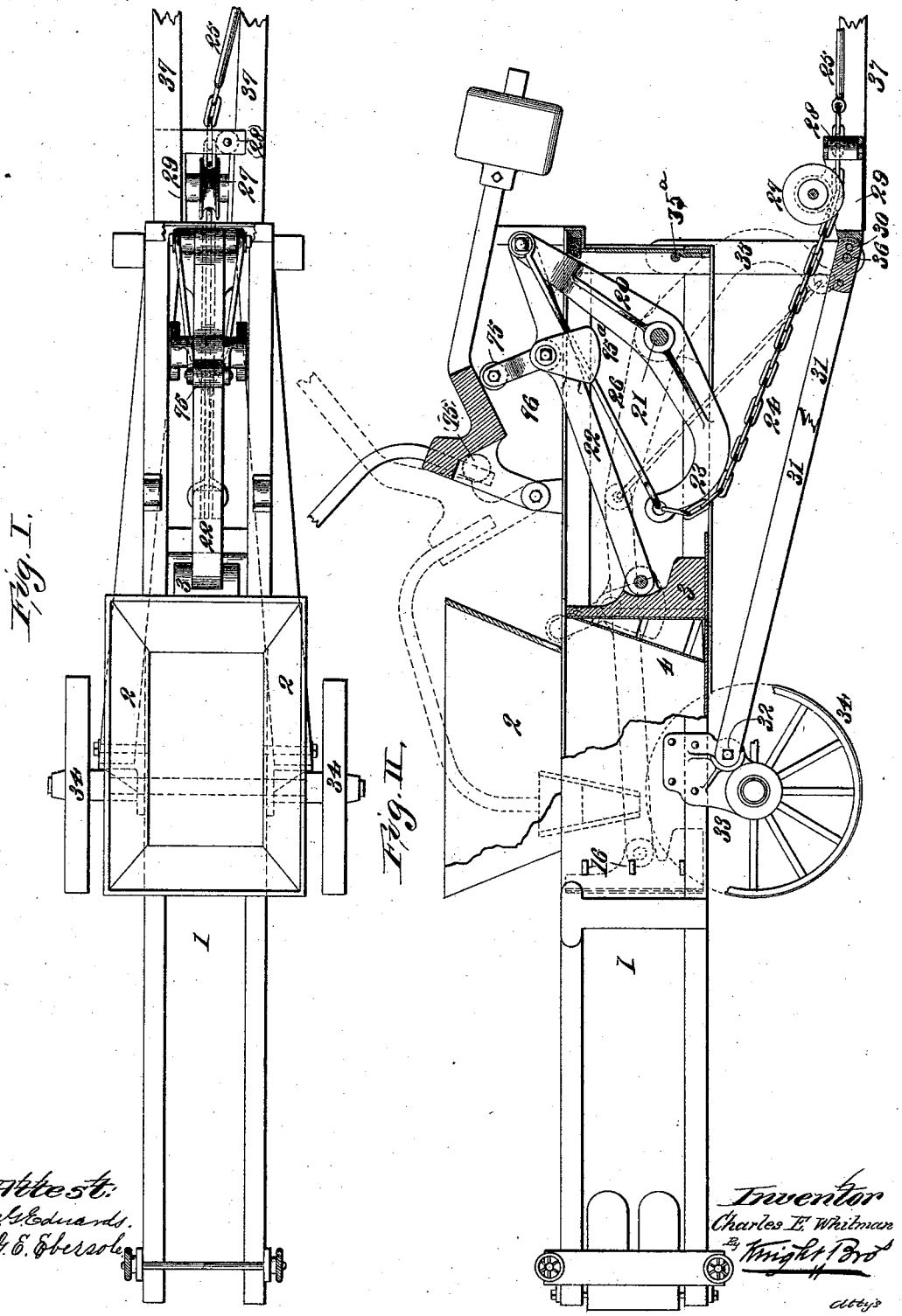

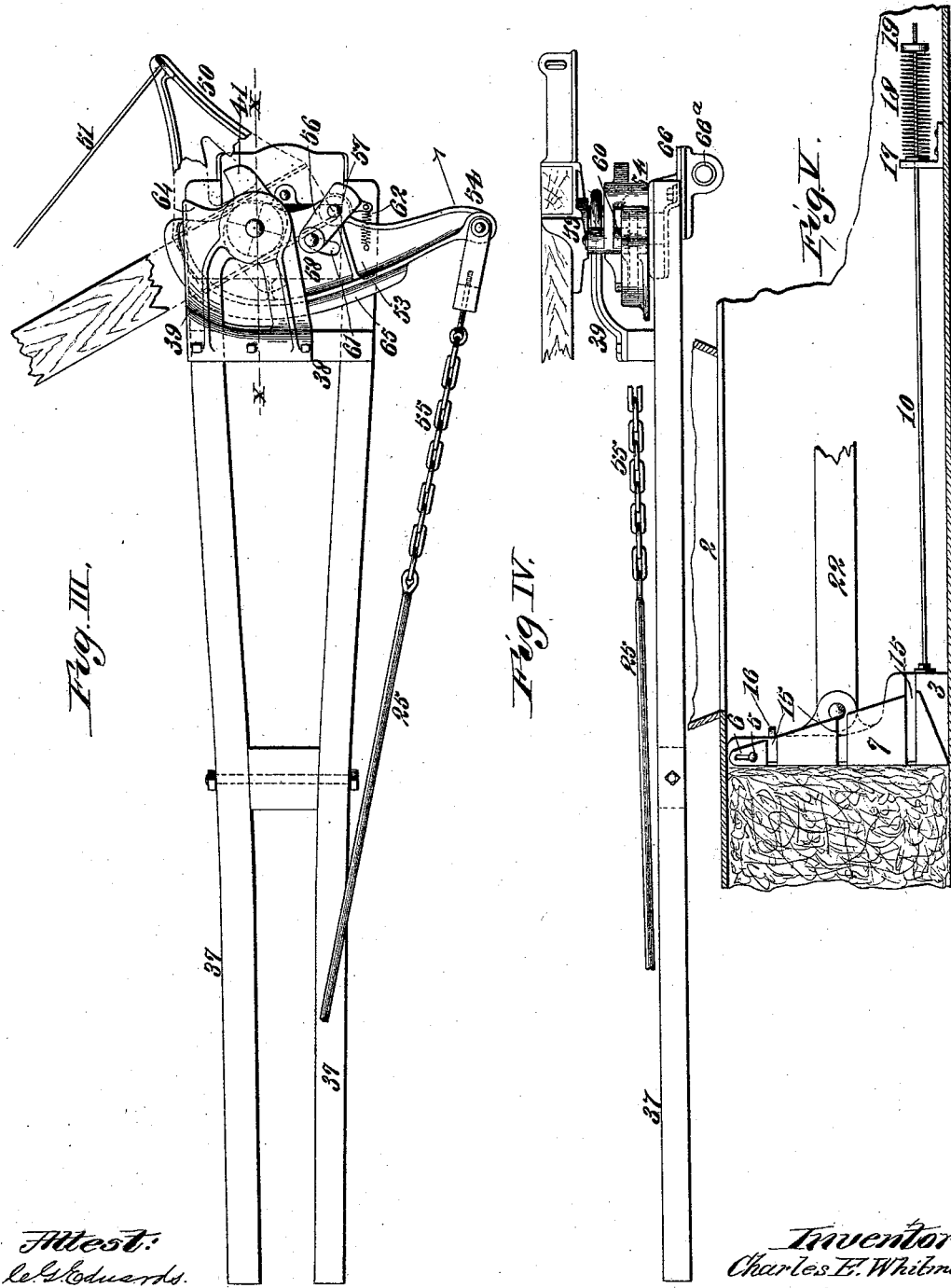

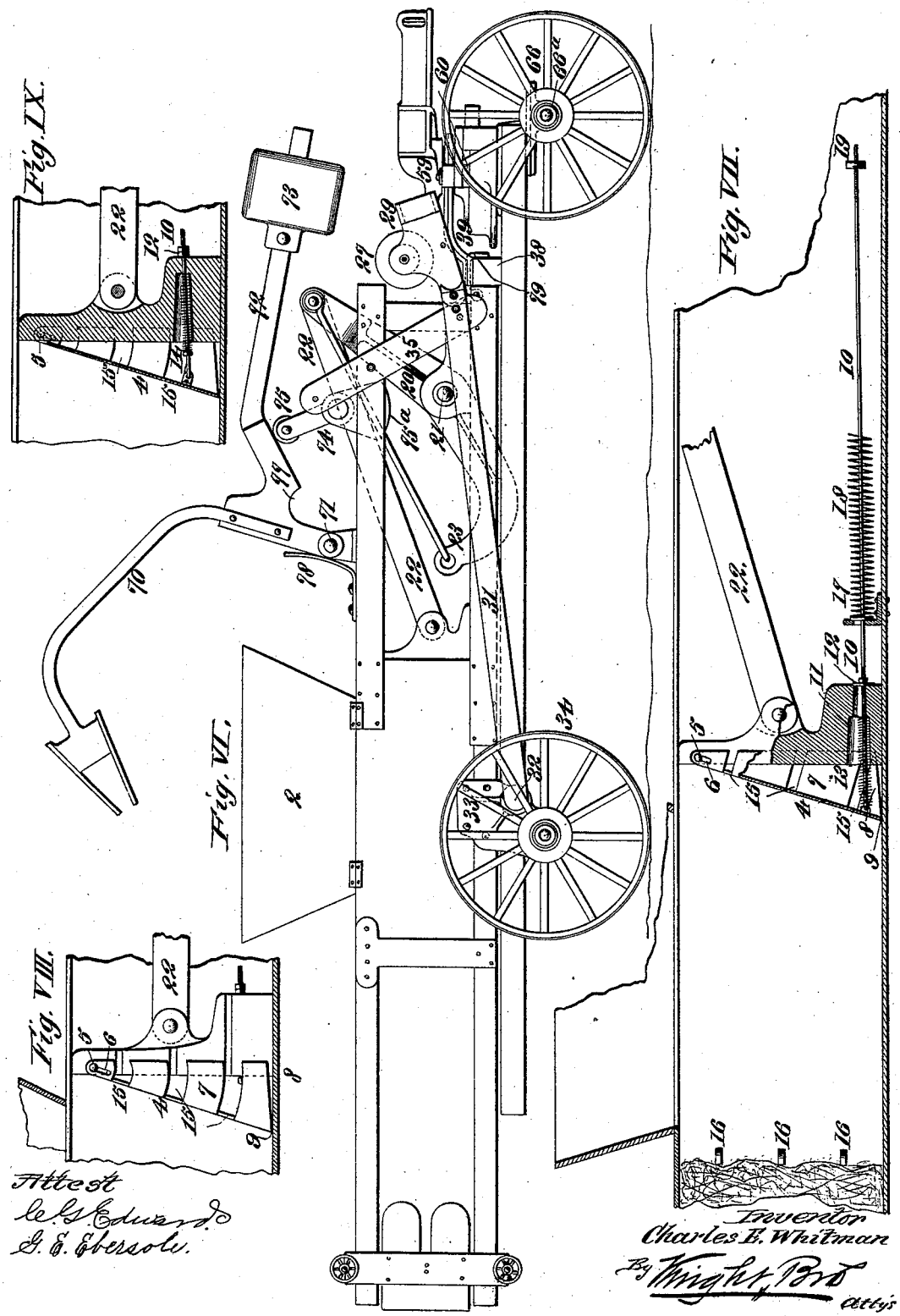

(No Model.) 4 Sheets—Sheet 4.
C. E. WHITMAN.
BALING PRESS.
No. 531,240. Patented Dec. 18, 1894.
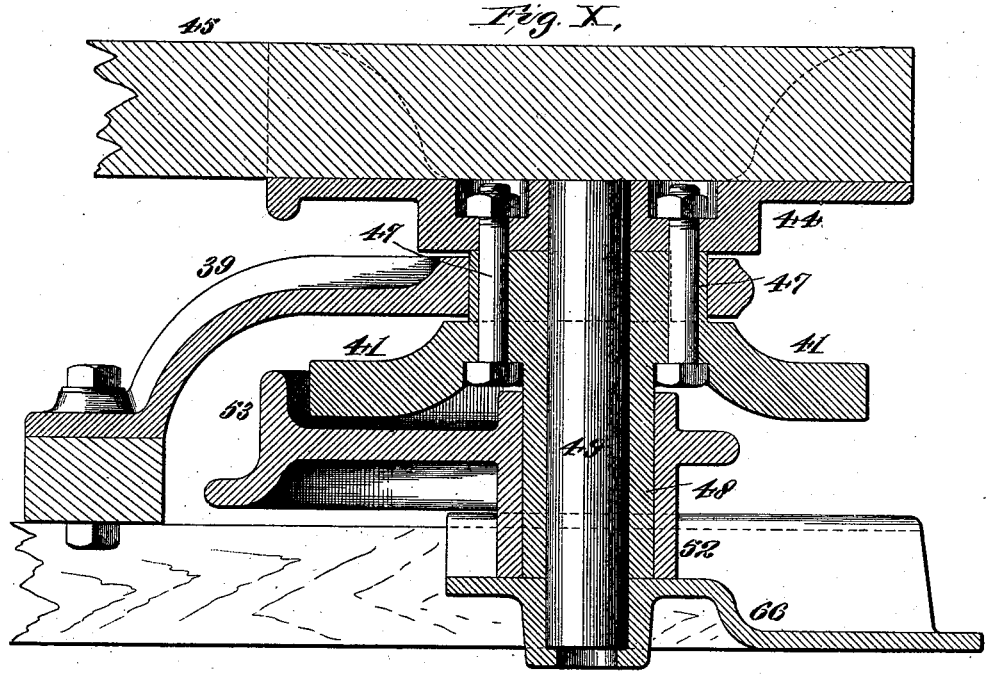
Fig. X.
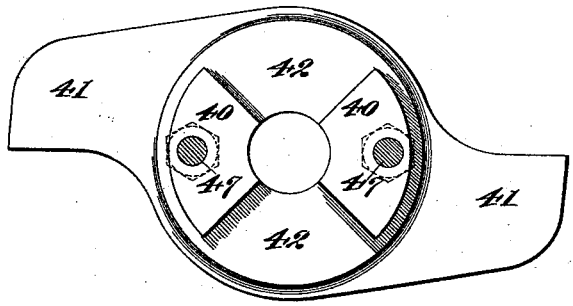
Fig. XI.
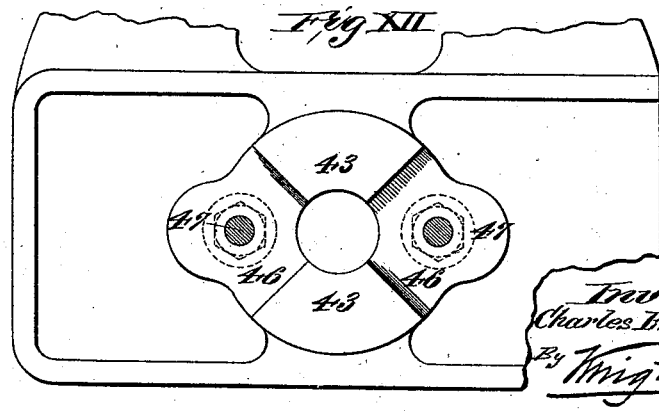
Fig. XII.
Attest:
le G. Edwards.
G. E. Ebersole.
Inventor:
Charles E. Whitman
By Wright Bro.
Atty's

UNITED STATES PATENT OFFICE.

CHARLES E. WHITMAN, OF ST. LOUIS, MISSOURI.

BALING-PRESS.

SPECIFICATION forming part of Letters Patent No. 531,240, dated December 18, 1894.

Application filed March 26, 1894. Serial No. 505,056. (No model.)

*To all whom it may concern:*

Be it known that I, CHARLES E. WHITMAN, of the city of St. Louis, in the State of Missouri, have invented a certain new and useful Improvement in Baling-Presses, of which the following is a full, clear, and exact description, reference being had to the accompanying drawings, forming part of this specification.

My invention relates to certain improvements in presses for baling hay, cotton, excelsior, and the like; and my improved machine is particularly adapted for baling hay or straw, either in its natural, long condition, or for baling chopped hay or straw, or other substances of short length, which are liable to be more dense at the bottom of the baling chamber than at the upper portion before the advance movement of the plunger.

My invention consists in features of novelty hereinafter fully described and pointed out in the claims.

Figure I is a top or plan view of the baling or plunger end of my improved press. Fig. II shows this end of the press part in side view, and part in vertical, longitudinal section. Fig. III is a top or plan view of the power end of the press. Fig. IV is a detail, side elevation of the power end of the press. Fig. V is an enlarged, detail, longitudinal section of the baling end of the press, the plunger being shown in side view, and in its advanced position. Fig. VI is a side view of the press folded for transportation. Fig. VII is an enlarged, detail, longitudinal section of the power end of the press, showing the plunger in its rear position. Figs. VIII and IX are detail views, showing a slight modification of the plunger; Fig. VIII being a side view, and Fig. IX a vertical section. Fig. X is an enlarged, vertical section of the power end of the press. Assuming that the sweep is in line with the length of the press, this section would be taken on line X—X, Fig. III. Fig. XI is a top view of the power arms of the press. Fig. XII is a detail, bottom view of the sweep casting.

Referring to the drawings, 1 represents the baling chamber of the press; 2, the hopper and 3 the plunger.

In baling hay or straw which has been cut or chopped up into short lengths, or in baling other materials which are short and which pack closely as they fall into the baling chamber, such, for instance, as shavings, these materials, before the plunger moves forward, pack and become more dense at the bottom of the baling chamber than at the top. The result is that in the finished bales there is more material at the bottom of the bales than at the top, and when the bales are discharged from the press they assume a curved shape, and with rough handling, and sometimes with careful handling, the ties slip from the bale entirely. To avoid this difficulty, and at the same time to make a press which may be used for either baling such short stuff, or at will be changed for baling hay or straw in their natural, long state, is one object of my invention, and for this purpose the plunger 3 has in front of it a false head 4. This head is preferably so connected to the plunger as to allow it to move upward slightly as it assumes a vertical position, so that its lower end may always ride on the bottom of the baling chamber.

The head is connected to the plunger by means of a rod or pin 5 passing through the plunger and fitting at its ends in slots 6, in the side wings 7 of the head. (See Fig. V.) The side wings of the head lap over the sides of the plunger, as shown in the drawings, and thus serve as guides to the head as well as forming a snug fit between the head and the side walls of the baling chamber. The lower edges of the side wings are preferably inclined, as shown at 8, so as not to interfere with the lower edge 9 of the head resting on the bottom of the baling chamber. (See Fig. VII.)

When the plunger is in its rear position, the head 4 assumes an inclined position, as shown in Figs. II and VII, and this may be effected by a rod 10 connected to the head and passing through a socket 11 in the plunger. On the rod 10, back of the plunger, is a nut 12, which limits the opening movement of the head 4. Surrounding the rod 10 is a spring 13, the inner end of which bears against the end of the socket 11, and the outer end of which bears against the head 4, as shown in Fig. VII, or against a nut 14 on the rod 10, as shown in Fig. IX. The tendency of the spring is to hold the head 4 in its inclined position. The head is provided with notches or grooves 15, to receive the retainers 16, ordinarily used in baling presses, so that the retainers do not interfere with the movement of the head and plunger in their forward movement.

In Fig. VII I have shown the rod 10 extending back a considerable distance, with the nut 19 on its end, the rod passing through a bracket 17 secured to the inside of the bottom of the press chamber. Surrounding the rod 10, back of the bracket 17, is a spring 18, the inner end of which bears against the bracket 17. As the plunger moves forward, and before it reaches the retainers 16, the nut 19 comes against the spring 18, and pulls the lower edge of the head 4 up against the plunger, thus bringing the head into a vertical position before it reaches the retainers 16. With this arrangement the slots 15 may be made quite narrow, and only slightly wider than the thickness of the retainers. In some instances, however, it may be more convenient not to have the rod 10 extend far back of the plunger, as shown in Fig. IX, and in this case, the slots 15 should be made quite wide, and on the arc of a circle, so that should the head 4 not be forced entirely back against the plunger at the time the retainers are reached, still the retainers will be received by the grooves. When the plunger is in its rear position, the inclined head 4 contracts the lower part of the space in the baling chamber which receives the stuff from the hopper, so that this space is smaller at bottom than it is at top, and owing to the tendency of short stuff or material to pack at bottom, owing to its own weight, the amount of material contained in the space is approximately the same at top as it is at bottom, because of the space being larger at the top than at the bottom. As the plunger advances, the pressure on the head 4 causes it to assume a vertical position, as shown in Fig. V. This vertical position is insured by the extension of the rod 10 and spring 18 in the construction shown in Fig. VII, while with the construction shown in Fig. IX, the head would assume a vertical position, owing to the resistance of the material being baled, except possibly when there happened to be a very light charge.

As the plunger reaches the limit of its forward movement, and the final pressure is exerted, the head thus presents a vertical surface to the stuff being baled. The spring 13 is of sufficient force to prevent the head 4 from assuming a vertical position until the pressure on the stuff is sufficient to keep it from moving downwardly or packing under its own weight. When the plunger recedes again, the head assumes its inclined position automatically, and thus the operation proceeds without attention from the workman.

By providing for the vertical movement of the head 4, its bottom 9 always rests upon the floor or bottom of the baling chamber. By adjusting the nut 12, the inclination of the head may be regulated so as to make the relative size at top and bottom of the chamber, which receives the material to be baled, whatever may be desired, according to the nature of the stuff being baled.

By drawing the head back against the face of the plunger, and holding it there, by tightening on the nuts 10, the press may be used as an ordinary press for baling long material, and thus with my invention a baling press, at a very small additional cost, may be used for baling either short or long material, at will.

I desire not to be limited to the exact manner of connecting the head to the plunger, either at its upper or lower end, as other means than the slots and pin may be used at the upper end and means other than the spring actuated rod 10 with nuts on its end may be employed at the lower end of the head.

20 represents a lever pivoted at 21 to the frame of the press, and one end of which is connected by a link 22 to the plunger 3. The other end of this lever is upwardly curved, as shown at 23, and to it is connected one end of a chain 24, the other end of which is connected to a rod 25 extending to the power end of the press. The ends of the lever 20 are connected together by a brace rod 26. The chain passes beneath a grooved pulley 27, and is held from lateral movement away from the pulley 27, by means of a roller 28. The pulley 27 and roller 28 are supported in a casting 29, hinged at 30 to the ends of two timbers 31 connected at 32 to castings 33 which support the press on the ground wheels 34. The outer ends of the timbers 31 are supported by legs 35 connecting them to the press chamber. The legs 35 are connected to the beams 31, as shown at 36.

When it is desired to move the machine from place to place, or to store it, the beams 31 with the casting 29, are moved into the position shown in Fig. VI; the legs 35 having been disconnected from the beams 31 and turned on their pivots 35ᵃ into the position shown in Fig. VI when the parts are folded.

37 represents timbers adapted to be bolted to the casting 29, one on each side of the casting, as shown in Fig. I. These timbers extend back to the power end of the press, where there is secured to them a cross-piece 38, to which is bolted a casting 39, the outline of which, in top view, is shown in Fig. III, a side view of which is shown in Fig. IV, and a section of which is shown in Fig. X. This casting has an eye or opening to receive the hub 40 of the power arms 41. The hub 40 is notched out, as shown at 42, Fig. XI, to receive a hub 43 on a casting 44 secured to the sweep 45, the hub 43 having openings 46, (see Fig. XII,) to receive the hub 40 of the power arms 41; the hub of the power arms thus interlocking with the hub of the casting 44. The casting 44 is secured to the power arms by means of bolts 47, as shown in Fig. X. The power arms are formed on a sleeve 48, through which passes a pin or bolt 49 that extends also through the casting 44. The casting 44 has an arm 50, connected to the sweep by means of a brace rod 51.

Fitting loosely on the sleeve 48 is the hub 52 of a cam 53, to the outer end 54 of which the rod 25 is connected by a chain 55. Carried by the cam 53 is an arm 56, pivoted to the cam at 57, and having on its inner end a pin 58, having an upper roller 59, and a lower roller 60. The pin 58 fits in a slot 61 in the cam 53, and the pin is kept normally at the inner end of a slot by means of a spring 62 connecting the outer end of the arm 56 to the cam, as shown in Fig. III. As the sweep moves around, one of the arms 41 comes against the lower roller 60 on the pin 58, and moves the outer end of the cam in the direction of the arrow, Fig. III, thus imparting movement to the plunger of the press. Just as the plunger reaches the limit of its forward movement, the upper roller 59 on the pin 58 comes against a projection 64 on the casting 39, and forces the inner end of the arm 56 outwardly, disengaging the lower roller 60 from the arm 41, when the parts will rebound to their normal position, and the next arm 41 coming against the roller 60 will cause the cam 53 to be moved again. The cam 53 has a ledge 65 on which the chain 55 rides as the cam is moved around.

66 is a casting secured to the extreme ends of the timbers 37, and in which the lower end of the pin 49 is seated and upon which the hub of the cam 53, and the lower end of the sleeve 48 rest, as shown in Fig. X. By combining the cam 53 with the lever 20, together with their connecting parts that move them, a very powerful pressure is obtained.

70 represents the feeder. It is pivoted at 71 to the top of the baling chamber, and has an arm 72 carrying a counter-balance weight 73. On the link 22 is pivoted an arm 74, the upper end of which is provided with a friction roller 75 bearing against the under side of the arm 72 of the feeder. On the pintle of the arm 74 is a counter-balance weight 75$^a$, resting against a lug 76 on the link 22. As the plunger advances, the arm 74 forces the feeder 70 into the hopper of the press. When the roller 75 reaches a notch 77 in the arm 72, the feeder moves back to its normal position under the influence of a spring 78 and the counter-balance weight 73; the position of the roller 75 being, at this time, as represented by dotted lines in Fig. II. As the plunger recedes, the arm 74 moves back out of the notch 77 by turning on its pivotal connection with the link 22, and as soon as the plunger recedes the arm 74 is brought back to its normal position, and there held by the counter-balance weight 75$^a$.

When the machine is to be moved or stored, the timbers 37 are disconnected from the casting 29, and run under the baling chamber, over the front axle, as shown in Fig. VI, the timbers 31 and legs 35 having been raised, as stated. The front supporting wheels are journaled to the pivotal casting 66, which is provided with bearings 66$^a$ to receive the front wheels, and when the parts are in this folded position, the cross piece 38 comes up against the ends of the lower timbers of the baling chamber, as shown in Fig. VI, and is there held by a hook 79, or other fastening.

I claim as my invention—

1. In a baling press, the combination of a baling chamber, a plunger located within the chamber, a head and means whereby the head is yieldingly connected to the plunger so as to assume an inclined position as the plunger recedes and a vertical position as the plunger advances; substantially as and for the purpose set forth.

2. In a baling press, the combination of a baling chamber, a plunger, a head hinged to the plunger, and means for causing the head to assume an inclined position as the plunger recedes; substantially as and for the purpose set forth.

3. In a baling press, the combination of a baling chamber, a plunger, a head having slot and pin connection with the plunger at its upper end, and means for causing the lower end of the head to assume an inclined position as the plunger recedes; substantially as and for the purpose set forth.

4. In a baling press, the combination of a baling chamber, a plunger, a head having side wings and hinged to the plunger at its upper end, and a spring actuated rod connecting the head to the plunger at its lower end; substantially as and for the purpose set forth.

5. In a baling press, the combination of a chamber, a plunger, a head having slotted side wings, a slot and pin connection between the head and the plunger, and a spring actuated rod for connecting the lower end of the head to the plunger; substantially as and for the purpose set forth.

6. In a baling press, the combination of a baling chamber, a plunger, a head having slotted side wings and hinged to the plunger, a rod secured to the head and fastening through the plunger, a spring located between the plunger and the head, a bracket through which said rod passes, a spring surrounding the rod back of the bracket, and a nut on the outer end of the rod; substantially as and for the purpose set forth.

7. In a baling press, the combination of a baling chamber, a plunger, means for imparting movement to the plunger, timbers hinged to the baling chamber, legs supporting the outer ends of the timbers, a casting pivoted to the timbers, a second set of timbers secured to said casting, and a power mechanism secured to the last mentioned timbers, substantially as and for the purpose set forth.

8. In a baling press, the combination of a plunger and a power mechanism, consisting of a casting 39, arms 41 having a hub 40, and spaces 42, a sweep, a casting 44 with a hub 43 having spaces 46, and which is secured to the sweep, bolts connecting the arms to said sweep casting, a cam sleeved onto said arms, and a connection between the cam and the plunger; substantially as and for the purpose set forth.

9. In a baling press, the combination of a plunger, a lever for moving the plunger, a link connecting the lever to the plunger, a feeder having a counterbalanced pivoted arm, and an arm 74 connected to said link, and adapted to bear against the counterbalanced pivoted arm of the feeder; substantially as and for the purpose set forth.

10. In a baling press, the combination of a plunger, a lever, a link connecting the lever to the plunger, an arm hinged to the link, a counter-balance weight actuating said arm, a roller on the arm, and an arm on the feeder provided with a counter-balance weight; substantially as set forth.

11. In a baling press, the combination of a feeder having an arm carrying a counter-balance weight, a plunger, a pivoted lever, a link connecting the lever to the plunger, an arm hinged to said link, and provided with a counter-balance weight, and a spring 78; substantially as and for the purpose set forth.

CHAS. E. WHITMAN.

In presence of—
A. M. EBERSOLE,
C. G. EDWARDS.